Oct. 7, 1930.  L. M. GOLDSMITH  1,777,844
CURRENT TRANSFER MECHANISM
Filed May 1, 1928
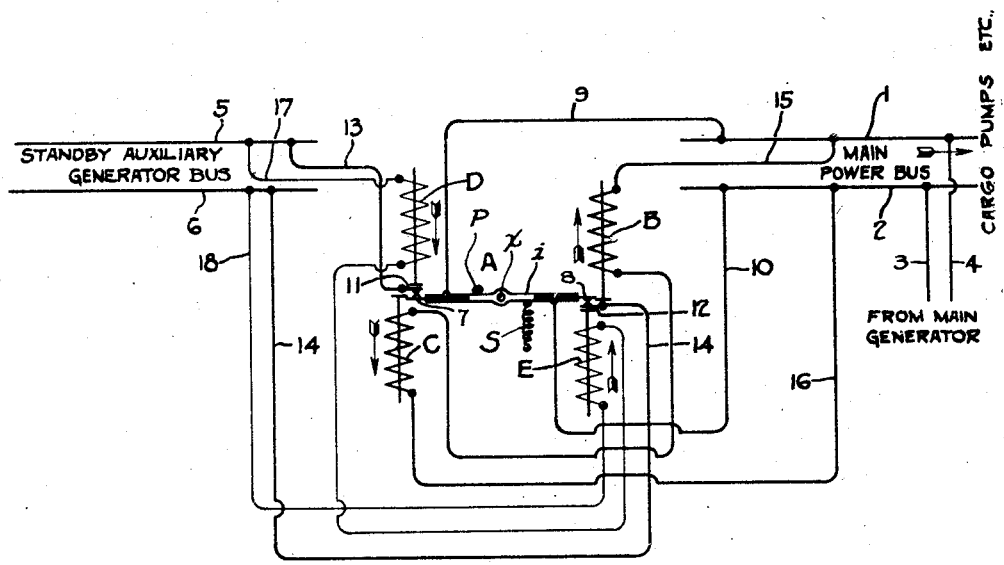
INVENTOR
LESTER M. GOLDSMITH.
BY *Wallace Quinn*
ATTORNEY Patented Oct. 7, 1930

1,777,844

UNITED STATES PATENT OFFICE

LESTER M. GOLDSMITH, OF HIGHLAND PARK, PENNSYLVANIA, ASSIGNOR TO THE ATLANTIC REFINING COMPANY, OF PHILADELPHIA, PENNSYLVANIA, A CORPORATION OF PENNSYLVANIA

CURRENT-TRANSFER MECHANISM

Application filed May 1, 1928. Serial No. 274,252.

This invention relates to a mechanism for simultaneously switching a secondary source of supply of electric power into a line to which power has been supplied from a primary source, when for any reason the primary source fails to supply power thereto.

My invention is particularly adaptable for use in connection with a Diesel electric installation in which two or more generators are driven by one or more Diesel engines. In accordance with this invention, when power is being supplied to certain electrically operated devices by one of the generators, lines from another of said generators are held disconnected from the lines leading to such devices, but upon the one generator failing to supply power to the devices, the lines from the second generator which will supply the necessary power are automatically and simultaneously connected to the lines leading to the devices.

A mechanism as hereinafter described is particularly adaptable for use in the circuits forming a part of a Diesel electric propulsion system for ships or the like, wherein the practice is to utilize a plurality of independently operated units, each of which may comprise, for example, a Diesel engine which directly drives a main generator and an auxiliary generator, both of which generators operate during the entire period of operation of the Diesel engine. It is not to be understood however, that the invention is limited to such use.

When two or more of such units comprise an installation, it is the practice to use the power from one or more main generators to drive the motor operating, for example, the ship's propeller. Ordinarily one or more of the auxiliary generators is used for standby purposes, as for example, for use in operating cargo pumps.

My invention provides means by which the required power, as for example from one or more of the auxiliary generators, may be switched into the lines leading from one or more main generators to the electrically operated devices when the voltage at which current is being supplied to the devices by the main generator falls below a predetermined minimum. Further, the invention provides means which positively disconnect the lines from the one or more auxiliary generators to the lines leading to the electrically operated devices when current at a voltage above said predetermined minimum is being supplied by the main generators to the electrically operated devices.

An example of a mechanism coming within the scope of this invention is one comprising a series of cores or the equivalent, which when connected across the lines supplying current from the main generator will function to positively disconnect the lines leading from the one or more auxiliary generators and the lines leading from the said main generator, when the main generator is supplying current at a voltage above a predetermined minimum to the line, but which when the main generator fails to supply current at a voltage above such minimum, will positively connect said lines to one or more auxiliary generators which will supply current at the necessary voltage thereto.

A further advantage of my invention is that in case the one or more auxiliary generators are incapable of supplying current at the necessary voltage to the lines leading to the power consuming mechanisms such generators will not be connected to such lines.

Referring to the single diagrammatic figure of the drawing which shows one embodiment of my invention, 1 and 2 are bus lines through which power is supplied to certain electrically operated devices. Lines 3 and 4 are leads to the lines 1 and 2 from one or more of the main generators. Lines 5 and 6 are leads from one or more of the standby auxiliary generators which may be connected through the automatic switch A to lines 1 and 2.

The switch A comprises an arm $i$ of insulating material which may turn to a limited extent about the pivot $x$, and which is provided at its respective opposite ends with contacts 7 and 8 connecting through lines 9 and 10 respectively to lines 1 and 2. Normally the switch arm $i$ stands in a horizontal position being held against pin P by spring S. Contacts 11 and 12 are arranged adjacent to the contacts 7 and 8 respectively. These contacts are connected by lines 13 and 14 respectively to lines 5 and 6.

A pilot circuit comprising lines 15 and 16 is connected across lines 1 and 2, said circuit having coils B and C connected in series therein. When current at a predetermined voltage is passed through this circuit, or in other words, when the necessary power is being supplied through the lines 1 and 2, these coils B and C operate upon their respective cores causing them to move in the direction indicated by the arrows to turn the switch arm $i$ in a counter clockwise direction against the pull of spring S, and thus move the contacts 7 and 8 away from the contacts 11 and 12.

A second pilot circuit comprising lines 17 and 18 is connected across lines 5 and 6 and this circuit has coils D and E connected in series therein. When current at a predetermined voltage is passed through this pilot circuit, that is when the necessary power may be supplied over lines 5 and 6, the coils D and E operate upon their respective cores which function to push contacts 11 and 12 respectively into contact with contacts 7 and 8 provided the last mentioned contacts are in their normal position.

The operation of the mechanism is as follows:

When the voltage in bus lines 1 and 2 reaches a predetermined minimum, coils B and C will become inoperative and the arm $i$ of the switch A will assume its normal horizontal position. Current at a sufficient voltage being supplied from one or more of the standby auxiliary generators over lines 5 and 6 will pass through the lines 17 and 18 to operate coils D and E respectively, which will push the contacts 11 and 12 into contact with contacts 7 and 8 now in their normal position, and thus complete connection between lines 5 and 6 and lines 1 and 2 respectively.

When current at a voltage in excess of the said predetermined minimum is supplied from the main generator, to the lines 1 and 2 thence through lines 15 and 16, the coils B and C will operate to pull the arm $i$ of the switch A in a counter clockwise direction, thereby breaking the contact between contacts 7 and 11 and 8 and 12 respectively. Obviously this will break the connection between lines 5 and 1 and lines 6 and 2 respectively.

When there is no voltage across lines 5 and 6, the coils D and E will not function, and the contacts 11 and 12 will not be held in contact with contacts 7 and 8 even though the switch arm $i$ is in its normal horizontal position and consequently there will be no electrical connection between lines 5 and 6 and lines 1 and 2.

Thus it will be seen that a simple means for accomplishing the results desired is provided. Various modifications of the specific mechanism used for the purpose of illustration will be apparent to those skilled in the art. Such modifications as come within the scope of the appended claims are considered a part of this invention.

What I claim is:

1. In combination, a current transfer mechanism, means for conducting current from at least two sources of supply to said mechanism, said mechanism comprising a pilot circuit connected across one of the means for conducting current from one of the sources of supply, said pilot circuit comprising means which upon passage therethrough of current at a voltage in excess of a predetermined minimum will operate to disconnect the means for conducting current from the one source from means for conducting current from a second source, a second pilot circuit connected across the means for conducting current from the second source and having means which upon passage of current at a predetermined voltage therethrough operates to connect the means for conducting current from said second source to the means for conducting current from the first source when current at a voltage less than a predetermined minimum is being supplied by said first source to the means for conducting current therefrom to the mechanism.

2. In combination, a current transfer mechanism, a source of supply of current, lines leading from said source of supply of current, a second source of supply of current and lines leading from said second source of supply, said mechanism having connections leading from the lines of each of the sources of current and an arm having contacts insulated from each other and connected respectively with the lines leading from the said first mentioned source of current, contacts connected with the lines leading from said second source of current adapted to engage with contacts on said arm, a pilot circuit connected across the lines from said first mentioned source of current having at least one relay therein which upon passage of current at a predetermined voltage therethrough will rotate said arm from its normal position, thereby moving the contacts of said arm away from said second mentioned contacts, a second pilot circuit connected across the lines leading from said second source of current having at least one relay therein, which upon passage of current at a predetermined voltage therethrough will push said second mentioned contacts into contact with the contacts on said arm when the arm is in its normal position.

3. In combination, two electric circuits each adapted to be independently energized, means interposed between said circuits, said means having at least two relays, one relay having its coil connected across the one circuit and a second relay having its coil connected across the second circuit, said one relay operating to disconnect the two circuits and said second relay operating to connect the circuits when the one relay is inoperative.

In testimony whereof I affix my signature.

LESTER M. GOLDSMITH.